(12) United States Patent
Mueller-Hagedorn

(10) Patent No.: US 11,524,894 B2
(45) Date of Patent: Dec. 13, 2022

(54) THERMAL INTEGRATION IN SYNTHESIS GAS PRODUCTION BY PARTIAL OXIDATION

(71) Applicant: L'Air Liquide, Société Anonyme pour l'Etude et l'Exploitation des Procédés Georges Claude, Paris (FR)

(72) Inventor: Matthias Mueller-Hagedorn, Frankfurt am Main (DE)

(73) Assignee: L'Air Liquide, Société Anonyme pour l'Etude et l'Exploitation des Procédés Georges Claude, Paris (FR)

(*) Notice: Subject to any disclaimer, the term of this patent is extended or adjusted under 35 U.S.C. 154(b) by 272 days.

(21) Appl. No.: 17/018,021

(22) Filed: Sep. 11, 2020

(65) Prior Publication Data
US 2021/0078860 A1 Mar. 18, 2021

(30) Foreign Application Priority Data
Sep. 12, 2019 (EP) .................... 19020527

(51) Int. Cl.
*C01B 3/36* (2006.01)
*B01J 19/00* (2006.01)

(52) U.S. Cl.
CPC ........... *C01B 3/363* (2013.01); *B01J 19/0013* (2013.01); *B01J 2219/0009* (2013.01); *B01J 2219/00092* (2013.01); *C01B 2203/0255* (2013.01); *C01B 2203/0883* (2013.01); *C01B 2203/1247* (2013.01)

(58) Field of Classification Search
CPC ........... C01B 3/363; C01B 2203/0255; C01B 2203/0833; C01B 2203/1247; B01J 19/0013; B01J 2219/0009; B01J 2219/00092
See application file for complete search history.

(56) References Cited

U.S. PATENT DOCUMENTS

| | | | |
|---|---|---|---|
| 5,415,673 A * | 5/1995 | Hilton | C10J 3/485 95/266 |
| 5,670,061 A | 9/1997 | Kowallik et al. | |
| 2008/0141588 A1 | 6/2008 | Kirchhubel et al. | |

FOREIGN PATENT DOCUMENTS

| | | |
|---|---|---|
| CN | 102329189 | 1/2012 |
| DE | 10 2006 059 149 | 6/2008 |
| WO | WO 03 080503 | 10/2003 |

OTHER PUBLICATIONS

European Search Report for corresponding EP 19020527.8, dated Feb. 14, 2020.

* cited by examiner

*Primary Examiner* — Jafar F Parsa
(74) *Attorney, Agent, or Firm* — Elwood L. Haynes

(57) ABSTRACT

A process and a plant are proposed for producing a synthesis gas including hydrogen and carbon oxides by partial oxidation of carbon-containing fuel in the presence of an oxygen-containing oxidant and a moderator, wherein the obtained raw synthesis gas is laden with soot particles. According to the invention the cooling of the raw synthesis gas is carried out using a crossflow heat exchanger, a shell and tube heat exchanger or a spiral heat exchanger, wherein the carbon-containing input stream or the oxidant stream or the moderator stream or a plurality of these streams serve as the first coolant and are thus preheated before introduction into the partial oxidation plant.

15 Claims, 1 Drawing Sheet

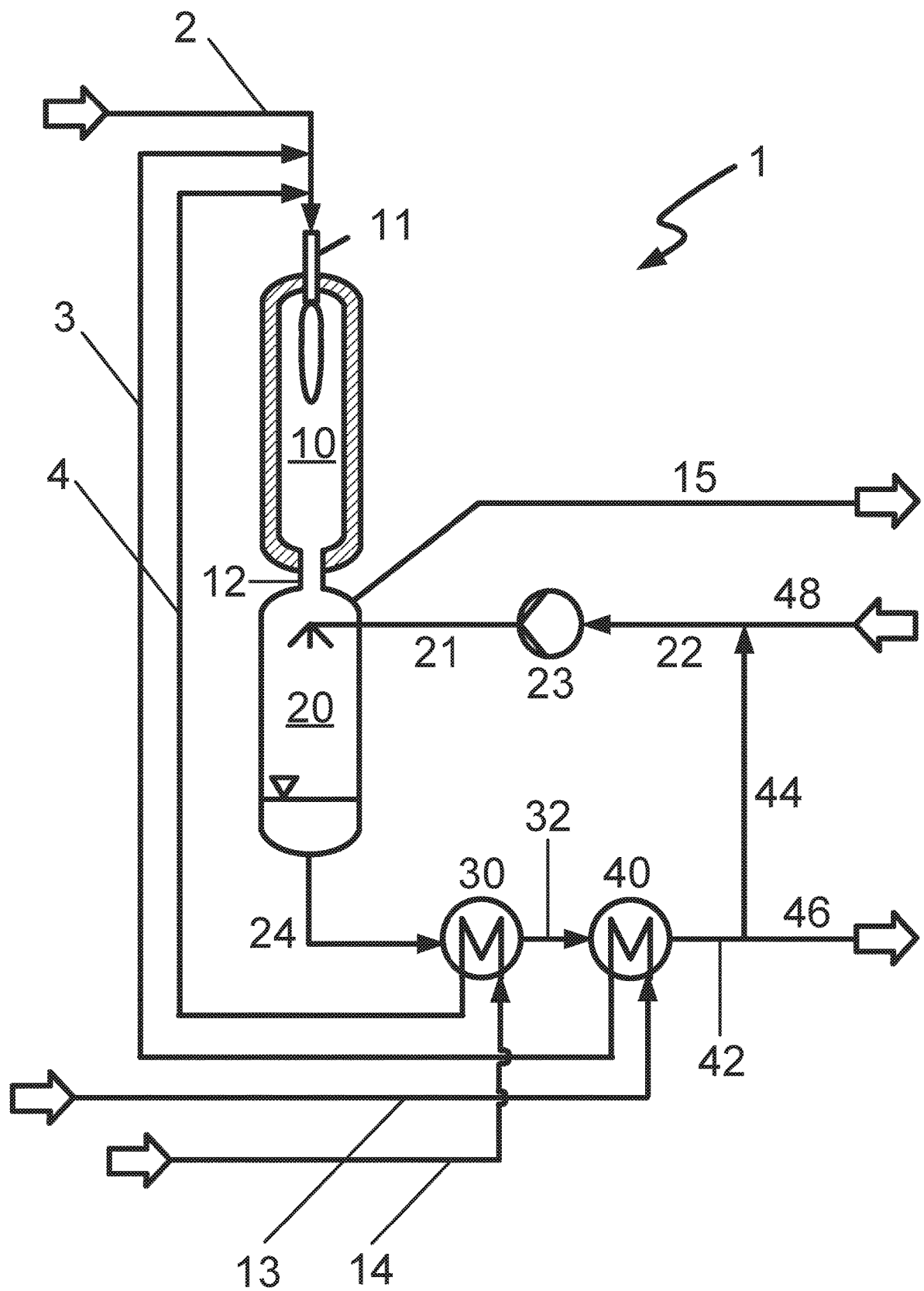

THERMAL INTEGRATION IN SYNTHESIS GAS PRODUCTION BY PARTIAL OXIDATION

CROSS REFERENCE TO RELATED APPLICATIONS

This application claims the benefit of priority under 35 U.S.C. § 119 (a) and (b) to European Patent Application No. 19020527.8, filed Sep. 12, 2019, the entire contents of which are incorporated herein by reference.

BACKGROUND

Field of the Invention

The invention relates to a process for producing a synthesis gas comprising hydrogen and carbon oxides by partial oxidation of solid, liquid or gaseous carbon-containing input streams, for example liquid fuels such as oil, heavy oil, pyrolysis oil or pyrolysis suspensions, so-called pyrolysis slurries, in the presence of an oxygen-containing oxidant and a moderator containing steam and/or carbon dioxide, wherein the obtained crude synthesis gas has a significant proportion of solids in the form of fine particles, for example in the form of soot, and is cooled using an instantaneous cooling (quench) arranged downstream of the partial oxidation.

The invention likewise relates to a plant for performing the process according to the invention.

Prior Art

Synthesis gases are gas mixtures containing hydrogen and carbon oxides which are used in various synthesis reactions. Examples thereof are methanol synthesis, the production of ammonia by the Haber-Bosch process or Fischer-Tropsch synthesis.

A commonly used process for producing synthesis gases is autothermal entrained flow gasification of gaseous, liquid or solid fuels by partial noncatalytic oxidation with an oxygen-containing oxidant as described for example in DE 10 2006 059 149 B4. At the top of a reactor an ignition and pilot burner are arranged centrally and a plurality of gasification burners are arranged with rotational symmetry to the reactor axis. Via the gasification burners the fuel with oxygen and steam as gasification agents is supplied to a gasification space of the reactor in which the fuel is converted into a synthesis gas. The hot gasification gas exits the gasification space together with the liquid slag and passes into a quench space into which water is injected for instantaneous cooling of raw synthesis gas and slag. The water used as quench medium collects in the bottom portion of the quench space as a water bath so that a quench-water fill level forms in the lower region of the quench space. The slag is deposited in the water bath and is removed via a slag discharge. The quenched raw synthesis gas is withdrawn from the quench space in a steam-saturated state and purified in subsequent purification stages. Since the fuel is directly reacted with the oxidant, oxidant and fuel are supplied coaxially or coannularly.

Depending on the employed inputs and the gasification conditions the gasification further produces soot in the form of soot particles. These are likewise deposited in the water bath.

Special technologies for gasification of liquid and gaseous fuels had already been developed by Texaco at the end of the 1940s and by Shell at the beginning of the 1950s. In later years, Lurgi began marketing a third technology which is known as multipurpose gasification (MPG) and was originally developed from the coal gasification process to dispose of the tars produced in said process.

Certain key features of all three processes are similar. All are operated with entrained flow reactors and the operating temperatures are similar, namely in the range from 1250° C. to 1450° C., When operating with liquid feeds all three processes produce a small amount of residual carbon which is necessary to eliminate the ash from the reactor. The processes differ essentially in the details of the burner design, the method of syngas cooling and the soot handling.

In the Texaco process the oil input material is mixed with steam as a moderator and preheated in a heater. The Texaco burner is water-cooled in that steam and oil are combined via an annular slot surrounding the central oxygen tube.

The process steam is used to atomize the oil input material and good mixing is ensured by swirling the two streams in opposite directions. The reactor itself is an empty, refractory vessel. Soot production is about 1% to 2% by weight based on the fuel input.

In one variant of the Texaco process the produced raw synthesis gas is cooled by direct quenching/instantaneous cooling in direct heat exchange with water as the quench medium. In this quench mode the hot raw synthesis gas exits the bottom of the reactor into the quench section via a dip tube. The quenched synthesis gas was saturated with water and exits the quench section at a temperature of about 250° C.

The high-water loading makes the quenched gas suitable for CO conversion without further steam addition. The quench removes the majority of the solids, for example soot, in the gas and these are discharged from the quench vessel as a soot-water slurry or "black water".

In the Texaco process the soot is extracted from the carbon-water mixture with naphtha and recycled into the reactor with the starting material where it is completely gasified. The black water from the quench and the scrubber is cooled and contacted with the naphtha in a decanter. The naphtha takes up the soot from the water and leaves behind the majority of the ash present in the water phase ("grey water").

The soot-naphtha mixture is withdrawn at the top of the decanter and mixed with fresh oil input material. The naphtha is recovered in a distillation column and recycled into the decanter and the soot-oil mixture is left behind as the bottoms product and recycled to the gasifier.

Other gasification processes operate a less complex treatment of the obtained soot filtercake; but it is at least subjected to drying before it is burnt or sent for disposal.

US patent document U.S. Pat. No. 5,670,061 likewise teaches the separation of gasification soot to obtain an aqueous slurry which is subsequently dried and then burnt.

Pyrolysis oils and pyrolysis tars obtained by pyrolysis of biomass may also be used as carbon-containing inputs for partial oxidation. The solid pyrolysis coke likewise formed may either be separated or remains in the pyrolysis oil and pyrolysis tar in the form of fine suspended particles, in which case the product is known as pyrolysis slurry or bioslurry.

In gasification processes by partial oxidation, input preheating is an essential measure to achieve the highest possible energy efficiency for the process. Especially in the gasification of liquid fuels or bioslurries having a viscosity of above 50 mPas at ambient temperature, achieving good atomization thereof in gasification burners requires that at least the carbon-containing input stream is preheated to reduce its viscosity.

Accordingly, the input streams, i.e. the carbon-containing input stream, the oxygen-containing oxidant stream and optionally the moderator stream, are usually preheated separately using heating steam. In the case of raw gas cooling using a waste heat boiler sufficient high-pressure steam is available for effective input preheating. By contrast, cooling of the produced raw synthesis gas with a water quench provides only low temperature heat in the form of quench water which at typical gasification pressures of 25 to 80 bar(a) is typically in the range from 150° C. to 250° C. In this case heating steam for preheating the input streams must therefore be imported from other plant parts, thus increasing the operating costs of the gasification plant. The required heating steam may alternatively be produced by burning a fuel in a heating boiler, though this requires additional plant components and will also result in elevated emissions of harmful substances. Finally, preheating could also be eschewed or the input materials preheated electrically, though both of these approaches would impair the energy balance of the process and increase the operating costs.

SUMMARY

It is accordingly an object of the present invention to propose a process for gasification of carbon-containing fuels in which the input streams are preheated in energy-saving, cost-effective and ideally environmentally neutral fashion in order to avoid the abovementioned disadvantages.

This object is achieved by a process having the features of claim 1. Further embodiments of the process according to the invention are discernible from the dependent process claims. The invention also relates to a plant for performing the process according to the invention with advantageous embodiments according to the dependent plant claims.

Process According to the Invention

A process for producing a raw synthesis gas containing hydrogen and carbon oxides by noncatalytic partial oxidation of a solid, liquid or gaseous carbon-containing input stream with an oxygen-containing oxidant, comprising the following steps:

(a) providing the carbon-containing input stream in fluid or fluidized form, providing an oxidant stream, optionally providing a moderator stream comprising steam and/or carbon dioxide, (b) providing a partial oxidation reactor comprising a reaction chamber having an inlet and an outlet, a burner arranged at the inlet of the reaction chamber and a cooling chamber arranged downstream of the outlet of the reaction chamber and in fluid connection therewith, (c) providing a cold, water-containing quench medium stream, (d) introducing the carbon-containing input stream, the oxidant stream and the optional moderator stream into the reaction chamber via the burner, (e) at least partially reacting the carbon-containing input stream with the oxidant stream under partial oxidation conditions in the burner and/or in the reaction chamber arranged downstream of the burner to afford a hot raw synthesis gas stream, (f) discharging the hot raw synthesis gas stream from the reaction chamber and introducing same into the cooling chamber, (g) subjecting the hot raw synthesis gas stream in the cooling chamber to the cold, water-containing quench medium stream to obtain a cold raw synthesis gas stream and a stream of hot, liquid quench medium laden with solids particles, (h) discharging the cold raw synthesis gas stream from the partial oxidation reactor for further processing or further treatment, (i) discharging the hot, liquid quench medium stream laden with solids particles from the partial oxidation reactor and introducing at least a portion of the hot quench medium stream into a first heat exchanger for cooling the hot quench medium stream by indirect heat exchange against a first coolant to obtain the cold quench medium stream, wherein the first heat exchanger is selected from the group of:
  (i1) crossflow heat exchangers, wherein the coolant is passed through tubes which have the hot quench medium stream flowing around them,
  (i2) shell and tube heat exchangers, wherein the coolant flows through the tube side and the hot quench medium stream flows through the shell side,
  (i3) spiral heat exchangers,
wherein the carbon-containing input stream or the oxidant stream or the moderator stream or a plurality of these streams serve as the first coolant and are thus preheated before introduction into the burner, (j) discharging the cold quench medium stream from the first heat exchanger and recycling at least a portion of the cold quench medium stream to the cooling chamber to form a quench medium stream circuit.

Plant According to the Invention

A plant for producing a raw synthesis gas containing hydrogen and carbon oxides by noncatalytic partial oxidation of a solid, liquid or gaseous carbon-containing input stream with an oxygen-containing oxidant, comprising the following constituents:

(a) means for providing the carbon-containing input stream in fluid or fluidized form, means for providing an oxidant stream, optionally means for providing a moderator stream comprising steam and/or carbon dioxide, (b) a partial oxidation reactor comprising a reaction chamber having an inlet and an outlet, a burner arranged at the inlet of the reaction chamber and a cooling chamber arranged downstream of the outlet of the reaction chamber and in fluid connection therewith, (c) means for providing a cold, water-containing quench medium stream, (d) means for introducing the carbon-containing input stream, the oxidant stream and the optional moderator stream into the burner, (e) means for discharging a hot raw synthesis gas stream from the reaction chamber and means for introducing same into the cooling chamber, (f) means for subjecting the hot raw synthesis gas stream in the cooling chamber to the cold, water-containing quench medium stream, (g) means for discharging a cold raw synthesis gas stream from the partial oxidation reactor, (h) means for discharging a hot, liquid quench medium stream laden with solids particles from the partial oxidation reactor, a first heat exchanger, means for introducing at least a portion of the hot quench medium stream into the first heat exchanger, wherein the first heat exchanger is selected from the group of:
  (h1) crossflow heat exchangers configured such that the coolant is passed through tubes which have the hot quench medium stream flowing around them, (h2) shell and tube heat exchangers configured such that the coolant flows through the tube side and the hot quench medium stream flows through the shell side, (h3) spiral heat exchangers, means for supplying the carbon-containing input stream or the oxidant stream or the moderator stream or a plurality of these streams to the first heat exchanger as the first coolant, (j) means for discharging the cold quench medium stream from the first heat exchanger and means for recycling at least a portion of the cold quench medium stream to the cooling chamber.

Partial oxidation conditions/gasification conditions are to be understood as meaning the reaction and process conditions known per se to a person skilled in the art, in particular of temperature, pressure and residence time, as discussed in detail in the relevant literature and under which at least partial conversion but preferably industrially relevant conversions of the reactants into synthesis gas products such as CO and hydrogen is affected.

Fluid connection between two regions or plant components is to be understood here as meaning any kind of connection that enables flow of a fluid, for example a reaction product or a hydrocarbon fraction, from one to the other of the two regions, irrespective of any interposed regions, components or required conveying means.

Fluids are to be understood as meaning substances which continually deform and therefore flow under the influence of shear forces. In this context "fluidized" is to be understood as meaning that finely divided, for example particulate, solids such as dumped beds are brought into a fluid-like state via process engineering measures such as mixing in order that they are conveyable and move together with the fluid phase.

A means is to be understood as meaning something that enables or is helpful in the achievement of a goal. In particular, means for performing a particular process step are to be understood as including all physical articles that would be considered by a person skilled in the art in order to be able to perform this process step. For example, a person skilled in the art will consider means of introducing or discharging a material stream to include all transporting and conveying apparatuses, i.e. for example pipelines, pumps, compressors, valves, which seem necessary or sensible to said skilled person for performance of this process step on the basis of his knowledge of the art.

The recited solid, liquid and gaseous/vaporous states of matter should always be considered in relation to the local physical conditions prevailing in the respective process step or in the respective plant component unless otherwise stated. In the context of the present application the gaseous and vaporous states of matter should be considered to be synonymous.

Pressures reported in the unit bar(a) relate to absolute pressure in bar absolute.

The invention is based on the recognition that the hot quench medium stream provides sufficient energy for preheating the carbon-containing input stream, the oxidant stream and an optional moderator stream. The hot quench medium stream constitutes a heat transfer medium not utilized in modern plants. The proposed process makes it possible to utilize the water hitherto unused as a heat transfer medium. Especially for liquid inputs that are thermally unstable or have a propensity for coking, a hotspot-avoiding, highly uniform preheating to a temperature level of about 200° C. is possible. Especially when the input has a propensity for thermally induced reactions, for example polymerizations, as is the case for pyrolysis oil for example, the use of this heat transfer medium is advantageous since the preheating is effected to a lower temperature level than in the case of preheating with high-pressure steam.

The hot quench medium stream is withdrawn either at the bottom of the cooling chamber or at its side wall. In the case of a highly solids-laden quench medium stream, a further settling container may optionally also be connected to the quench region. The temperature of the quenching water is in the range from 190° C. to 250° C., depending on the gasification pressure. At very low solids loadings (soot, ash, slag), hot quench medium stream may after cooling be reused directly as quench medium or else as washing liquid at another point in the process or in an adjacent process. By contrast, at relatively high loadings of ash, slag or soot it is advantageous before reuse thereof to decompress the hot quench medium stream and separate its solids content, for example by filtration using a band filter or filter press.

In respect of the first heat exchanger to be employed the relatively large amount of hot quench medium lends itself to the use of crossflow heat exchangers since they require the smallest heat transfer area, thus allowing a compact construction despite high fouling factors on account of the solids-laden quench medium. It is alternatively possible to employ shell and tube heat exchangers, wherein the hot, solids-laden quench medium is passed through the heat exchanger on the shell side, thus allowing easy cleaning of the apparatus. It must be ensured that the tube spacing (pitch) is sufficient to prevent blocking or plugging of the passage of quench water by larger solids particles (pieces of lining, ash, slag).

In the case of liquid inputs having a propensity for polymerization or for coking (residue oils, pyrolysis oils) it has been found that especially spiral heat exchangers are suitable since they are easy to clean and, in addition, a self-cleaning effect brought about by local velocity elevations efficiently prevents deposits.

An advantageous embodiment of the process according to the invention is characterized in that at least a second heat exchanger for cooling the hot quench medium stream by indirect heat exchange is present, wherein the second heat exchanger is operated with a second coolant selected from the group of: carbon-containing input stream, oxidant stream, moderator stream. This allows preheating of a further operating medium stream and there is an additional degree of freedom in the adjustment of the preheating temperature for this additional operating medium stream.

A further aspect of the process according to the invention is characterized in that a proportion of the hot or cooled quench medium stream is discharged from the quench medium stream circuit as a purge stream and quantitatively replaced by fresh water or solids-free condensate streams, for example steam condensate. This makes it possible to avoid accumulation of certain, especially dissolved or colloidally dispersed, impurities in the quench medium circuit.

In a further advantageous embodiment of the process according to the invention the quench medium stream is supplied to an apparatus for solids separation before recycling to the cooling chamber. This reduces the propensity for blocking of the apparatuses, for example nozzles, used for introducing the cold quench medium into the cooling chamber.

Alternatively, or in addition to, the last-mentioned embodiment a further advantageous embodiment of the process according to the invention provides that the hot quench medium stream is supplied to the apparatus for solids separation before introduction into the first heat exchanger. This makes it possible to separate solids particles, thus reducing the propensity for blocking of the first heat exchanger arranged downstream thereof and allowing said exchanger to be operated for longer without a shutdown for cleaning.

Alternatively, or in addition to, the two last-mentioned embodiments a further advantageous embodiment of the process according to the invention provides that the cold quench medium stream is supplied to the apparatus for solids separation after discharging from the first heat exchanger. This makes it possible to separate especially finer solids particles that have passed through any upstream solids separation stages. This reduces the propensity for blocking of the apparatuses, for example nozzles, used for introducing the cold quench medium into the cooling chamber.

A further aspect of the process according to the invention is characterized in that when using a shell and tube heat exchanger or a crossflow heat exchanger the tubes traversed by the coolant are arranged vertically and the hot quench medium is run in crossflow, co-current or countercurrent relative to the flow direction of the coolant, wherein the flow direction of the quench medium through the heat exchanger is substantially vertically upwards or downwards and wherein a storage volume for accommodating solids deposits and a service opening for removal of the solids deposits are provided at the bottom of the heat exchanger. The vertical arrangement of the tubes traversed by the coolant has the result that their propensity for fouling is very low. Solids deposits settle at the bottom of the heat exchanger, for example in the storage volume intended therefor, by sedimentation and may readily be removed via the service opening. If the service opening is in the form of a valve, solids removal may even be carried out when the process/plant is in ongoing operation.

A further aspect of the process according to the invention is characterized in that a pyrolysis oil or pyrolysis slurry is used as the carbon-containing input stream and a spiral heat exchanger is used as the first heat exchanger. In the case of such inputs having a propensity for polymerization or for coking it has been found that especially spiral heat exchangers are suitable since they are easy to clean and, in addition, a self-cleaning effect brought about by local velocity elevations efficiently prevents deposits.

A further aspect of the process according to the invention is characterized in that the pressure in the reaction chamber and in the cooling chamber is between 25 and 80 bar(a) and the temperature of the hot quench medium stream is between 150° C. and 250° C. This is a typical operating pressure of a partial oxidation reactor which results in an economically advantageous space-time yield and is matched to downstream process stages. Surprisingly the temperature of the thus obtained hot quench medium stream is particularly advantageous for preheating operating medium streams since excessive temperatures which result in undesired side reactions such as polymerization and coking are avoided.

A further aspect of the process according to the invention is characterized in that the preheating temperature of the carbon-containing input stream before introduction into the burner is between 200° C. and 400° C. for gaseous input streams, between 150° C. and 300° C. for liquid input streams and between 20° C. and 150° C. for pyrolysis oils or pyrolysis slurries as the input stream. Investigations have shown that by maintaining these temperature ranges an efficient preheating performance is obtained while simultaneously avoiding overheating of the respective medium, wherein gaseous input streams are least sensitive and pyrolysis oils and pyrolysis slurries are particularly sensitive to overheating.

A further aspect of the process according to the invention is characterized in that the preheating temperature of the oxygen-containing oxidant before introduction into the burner is between 120° C. and 250° C. Investigations have shown that by maintaining this temperature range a particularly energy-efficient preheating of the oxidant stream is achieved.

In a particular embodiment of the plant according to the invention said plant comprises a second heat exchanger in fluid connection with the quench medium stream. This allows preheating of a further operating medium stream and there is an additional degree of freedom in the adjustment of the preheating temperature for this additional operating medium stream.

In a further particular embodiment of the plant according to the invention said plant comprises an apparatus for solids separation in fluid connection with the quench medium stream. This makes it possible to separate solids particles, thus reducing the propensity for blocking of the first heat exchanger arranged downstream thereof and allowing said exchanger to be operated for longer without a shutdown for cleaning.

A further aspect of the plant according to the invention is characterized in that in the case of the tube bundle heat exchanger or the crossflow heat exchanger the tubes traversed by the coolant are arranged vertically and a storage volume for accommodating solids deposits and a service opening for removing the solids deposits are provided at the bottom of the heat exchanger. The vertical arrangement of the tubes traversed by the coolant has the result that their propensity for fouling is very low. Solids deposits settle at the bottom of the heat exchanger, for example in the storage volume intended therefor, by sedimentation and may readily be removed via the service opening. If the service opening is in the form of a valve, solids removal may even be carried out when the process/plant is in ongoing operation.

BRIEF DESCRIPTION OF THE DRAWING

Developments, advantages and possible applications of the invention are also apparent from the following description of exemplary embodiments and the drawing. All the features described and/or shown in images, alone or in any combination, form the invention, irrespective of the way in which they are combined in the claims or the dependency references therein.

FIG. 1 shows a preferred embodiment of the process according to the invention/the plant according to the invention.

DESCRIPTION OF THE PREFERRED EMBODIMENTS

In the plant 1 shown in schematic form in FIG. 1 for synthesis gas production by noncatalytic partial oxidation of a pyrolysis oil as a liquid, carbon-containing input stream, the reaction chamber 10 is supplied via the burner 11 with the media pyrolysis oil via conduits 13 and 3, steam as a moderator via conduit 2 and oxygen as an oxidant via conduits 14 and 4. The detailed media path is not depicted in the figure; thus a pre-mixing of one or more of the media, for example of the pyrolysis oil or the oxidant or both, with the moderator may be carried out upstream of the burner or in the burner itself, wherein steam or carbon dioxide or mixtures of these substances are used as the moderator.

The reaction of the pyrolysis oil with the oxidant to afford a raw synthesis gas is carried out under partial oxidation conditions in the burner 11 and/or in the reaction chamber 10 arranged downstream of the burner to afford a hot raw synthesis gas stream.

Via conduit 12 the raw synthesis gas laden with soot particles enters the cooling chamber 20 which is configured as a quench. By spraying water which is supplied via conduits 21 and 22 as a cold quench medium stream, said quench instantaneously lowers the temperature of the raw synthesis gas to a temperature between 150° C. and 250° C. at a typical pressure between 25 and 80 bar(a). The thus obtained cooled raw synthesis gas largely freed of solids particles is subsequently discharged from the partial oxidation plant via conduit 15 and sent for further processing or further treatment.

The hot, liquid quench medium laden with solids particles collects in the lower region of the cooling chamber and forms a liquid fill level therein. The hot quench medium is then discharged from the cooling chamber 20 via conduit 24 and passed to the first heat exchanger 30 via conduit 24. When the hot quench medium is discharged at the lowest point of the cooling chamber 20 as shown, said medium is advantageously applied to an apparatus for solids separation (not shown) to separate at least a portion of the entrained solids particles before the hot quench medium is passed on to the first heat exchanger 30. This allows especially coarse solids fractions to be kept away from the first heat exchanger 30.

It is alternatively possible to discharge the hot, particle-laden quench medium not at the lowest point of the cooling chamber 20 but rather slightly thereabove. This advantageously effects a certain solids preseparation, so that the first heat exchanger 30 is subjected less in the way of solids. The solids accumulating at the lowest point of the cooling chamber by sedimentation may then be discharged from the cooling chamber continuously or discontinuously, and separately from the hot quench medium. Continuous discharging may be realized for example via a rotary star valve. This solids preseparation may also be amplified by configuring the bottom of the cooling chamber as a relaxation zone, for example through the use of internals such as dividing walls.

Since the present working example uses pyrolysis oil as the liquid carbon-containing input stream for the partial oxidation it is advantageous for heat exchanger 30 or 40 or both to be configured as spiral heat exchangers. In the case of such inputs having a propensity for polymerization or for coking it has been found that especially spiral heat exchangers are suitable since they are easy to clean and, in addition, a self-cleaning effect brought about by local velocity elevations efficiently prevents deposits.

If the first and/or second heat exchanger are configured as a crossflow or shell and tube heat exchanger it is advantageous when the tubes traversed by the coolant are arranged vertically and the hot quench medium is run in crossflow, co-current or countercurrent relative to the flow direction of the coolant, wherein the flow direction of the quench medium through the heat exchanger should be substantially vertically upwards or downwards and wherein a storage volume for accommodating solids deposits and a service opening for removal of the solids deposits are advantageously provided at the bottom of the heat exchanger. The vertical arrangement of the tubes traversed by the coolant has the result that their propensity for fouling is very low. Solids deposits settle at the bottom of the heat exchanger, for example in the storage volume intended therefor, by sedimentation and may readily be removed via the service opening. If the service opening is in the form of a valve, solids removal may even be carried out when the process/plant is in ongoing operation.

The first heat exchanger 30 performs a first partial cooling of the hot quench medium in indirect heat exchange against the oxidant stream supplied via conduit 14 as the first coolant which is thus preheated and passed to the burner 11 via conduit 4. The partially cooled quench medium is then passed to the second heat exchanger 40 via conduit 32. The second heat exchanger 40 performs the further partial cooling of the quench medium in indirect heat exchange against the carbon-containing input stream (presently pyrolysis oil) supplied via conduit 13 as the second coolant which is thus likewise preheated and passed to the burner 11 via conduit 3.

The cold quench medium is discharged from the second heat exchanger 40 via conduit 42 and, via conduits 44, 22, 21 and pump 23, recycled as cold quench medium to the cooling chamber 20, thus forming a closed quench medium circuit. A small proportion compared to the recirculating mass flow of the quench medium is continuously discharged from the process via conduit 46 to limit contamination of the circulating quench medium by fine solids fractions and undesired dissolved substances. The discharged mass flow of the quench medium is continuously replaced by fresh water via conduit 48.

The specified choice of the first and the second coolant offers particular advantages: The oxidant less sensitive to overheating encounters the still-hot quench medium stream as the first coolant in the first heat exchanger while the already partially cooled quench medium is further cooled with pyrolysis oil as the second coolant in the second heat exchanger. In this way the pyrolysis oil as the carbon-containing input stream is preheated, but overheating, which can result in undesired side reactions on account of the reactivity of several ingredients, is avoided.

INDUSTRIAL APPLICABILITY

The invention proposes an advantageous process for producing a synthesis gas by partial oxidation of solid, liquid or gaseous carbon-containing input streams which achieves high thermal integration by utilizing the hot quench medium for preheating operating streams.

LIST OF REFERENCE NUMERALS

1 Plant
2-4 Conduit
10 Reaction chamber of partial oxidation reactor
11 Burner
12-15 Conduit
20 Cooling chamber of partial oxidation reactor
13-14 Conduit
21-22 Conduit
23 Pump
24 Conduit
30 First heat exchanger
32 Conduit
40 Second heat exchanger
42-48 Conduit

What is claimed is:

1. A process for producing a raw synthesis gas containing hydrogen and carbon oxides by noncatalytic partial oxidation of a solid, liquid or gaseous carbon-containing input stream with an oxygen-containing oxidant, comprising:
   (a) providing the carbon-containing input stream in fluid or fluidized form, providing an oxidant stream, (b) providing a partial oxidation reactor comprising a reaction chamber having an inlet and an outlet, a burner arranged at the inlet of the reaction chamber and a cooling chamber arranged downstream of the outlet of the reaction chamber and in fluid connection therewith, (c) providing a cold, water-containing quench medium stream, (d) introducing the carbon-containing input stream and the oxidant stream into the reaction chamber via the burner, (e) at least partially reacting the carbon-containing input stream with the oxidant stream under partial oxidation conditions in the burner and/or in the reaction chamber arranged downstream of the burner to afford a hot raw synthesis gas stream, (f) discharging the hot raw synthesis gas stream from the reaction chamber and introducing same into the cooling chamber, (g) subjecting the hot raw synthesis gas stream in the cooling chamber to the cold, water-containing quench medium stream to obtain a cold raw synthesis gas stream and a stream of hot, liquid quench medium laden with solids particles, (h) discharging the cold raw synthesis gas stream from the partial oxidation reactor for further processing or further treatment, (i) discharging the hot, liquid quench medium stream laden with solids particles from the partial oxidation reactor and introducing at least a portion of the hot quench medium stream into a first heat exchanger for cooling the hot quench medium stream by indirect heat exchange against a first coolant to obtain the cold quench medium stream, wherein the first heat exchanger is selected from the group consisting of:

(i1) crossflow heat exchangers, wherein the coolant is passed through tubes which have the hot quench medium stream flowing around them, (i2) shell and tube heat exchangers, wherein the coolant flows through the tube side and the hot quench medium stream flows through the shell side, and (i3) spiral heat exchangers, wherein the carbon-containing input stream or the oxidant stream or a plurality of these streams serve as the first coolant and are thus preheated before introduction into the burner, and (j) discharging the cold quench medium stream from the first heat exchanger and recycling at least a portion of the cold quench medium stream to the cooling chamber to form a quench medium stream circuit.

2. The process according to claim 1, wherein at least a second heat exchanger for cooling the hot quench medium stream by indirect heat exchange is present, wherein the second heat exchanger is operated with a second coolant selected from the group of: carbon-containing input stream and oxidant stream.

3. The process according to claim 1, wherein a proportion of the hot or cooled quench medium stream is discharged continuously or batchwise from the quench medium stream circuit as a purge stream and quantitatively replaced by fresh water or solids-free condensate streams.

4. The process according to claim 1, wherein the quench medium stream is supplied to an apparatus for solids separation before recycling to the cooling chamber.

5. The process according to claim 4, wherein the hot quench medium stream is supplied to the apparatus for solids separation before introduction into the first heat exchanger.

6. The process according to claim 4, wherein the cold quench medium stream is supplied to the apparatus for solids separation after discharging from the first heat exchanger.

7. The process according to claim 1, wherein, when using a shell and tube heat exchanger or a crossflow heat exchanger the tubes traversed by the coolant are arranged vertically and the hot quench medium is run in crossflow, co-current or countercurrent relative to the flow direction of the coolant, wherein the flow direction of the quench medium through the heat exchanger is substantially vertically upwards or downwards and wherein a storage volume for accommodating solids deposits and a service opening for removal of the solids deposits are provided at the bottom of the heat exchanger.

8. The process according to claim 1, wherein a pyrolysis oil or pyrolysis slurry is used as the carbon-containing input stream and a spiral heat exchanger is used as the first heat exchanger.

9. The process according to claim 1, wherein the pressure in the reaction chamber and in the cooling chamber is between 25 and 80 bar(a) and the temperature of the hot quench medium stream is between 150° C. and 250° C.

10. The process according to claim 1, wherein the preheating temperature of the carbon-containing input stream before introduction into the burner is between 200° C. and 400° C. for gaseous input streams, between 150° C. and 300° C. for liquid input streams and between 20° C. and 150° C. for pyrolysis oils or pyrolysis slurries as the input stream.

11. The process according to claim 1, wherein the preheating temperature of the oxygen-containing oxidant before introduction into the burner is between 120° C. and 250° C.

12. A plant for producing a raw synthesis gas containing hydrogen and carbon oxides by noncatalytic partial oxidation of a solid, liquid or gaseous carbon-containing input stream with an oxygen-containing oxidant, comprising:

(a) a means for providing the carbon-containing input stream in fluid or fluidized form, a means for providing an oxidant stream, (b) a partial oxidation reactor comprising a reaction chamber having an inlet and an outlet, a burner arranged at the inlet of the reaction chamber and a cooling chamber arranged downstream of the outlet of the reaction chamber and in fluid connection therewith, (c) a means for providing a cold, water-containing quench medium stream, (d) a means for introducing the carbon-containing input stream and the oxidant stream into the burner, (e) a means for discharging a hot raw synthesis gas stream from the reaction chamber and a means for introducing same into the cooling chamber, (f) a means for subjecting the hot raw synthesis gas stream in the cooling chamber to the cold, water-containing quench medium stream, (g) a means for discharging a cold raw synthesis gas stream from the partial oxidation reactor, (h) a means for discharging a hot, liquid quench medium stream laden with solids particles from the partial oxidation reactor, a first heat exchanger, a means for introducing at least a portion of the hot quench medium stream into the first heat exchanger, wherein the first heat exchanger is selected from the group consisting of:

(h1) crossflow heat exchangers configured such that the coolant is passed through tubes which have the hot quench medium stream flowing around them,
(h2) shell and tube heat exchangers configured such that the coolant flows through the tube side and the hot quench medium stream flows through the shell side, and
(h3) spiral heat exchangers,
a means for supplying the carbon-containing input stream or the oxidant stream or the moderator stream or a plurality of these streams to the first heat exchanger as the first coolant,
(j) a means for discharging the cold quench medium stream from the first heat exchanger and a means for recycling at least a portion of the cold quench medium stream to the cooling chamber.

13. The plant according to claim 12, further comprising a second heat exchanger in fluid connection with the quench medium stream.

14. The plant according to claim 12, further comprising an apparatus for solids separation in fluid connection with the quench medium stream.

15. The plant according to claim 12, wherein in the case of the shell and tube heat exchanger or the crossflow heat exchanger the tubes traversed by the coolant are arranged vertically and a storage volume for accommodating solids deposits and a service opening for removing the solids deposits are provided at the bottom of the heat exchanger.

* * * * *